United States Patent
Lavertu (10) Patent No.: US 10,829,104 B2
(45) Date of Patent: Nov. 10, 2020

(54) HYBRID VEHICLE CONTROL SYSTEM

(71) Applicant: General Electric Company, Schenectady, NY (US)

(72) Inventor: Thomas Michael Lavertu, Ballston Lake, NY (US)

(73) Assignee: GE GLOBAL SOURCING LLC, Norwalk, CT (US)

(*) Notice: Subject to any disclaimer, the term of this patent is extended or adjusted under 35 U.S.C. 154(b) by 299 days.

(21) Appl. No.: 15/899,216

(22) Filed: Feb. 19, 2018

(65) Prior Publication Data

US 2019/0256078 A1    Aug. 22, 2019

(51) Int. Cl.
| | |
|---|---|
| B60W 20/12 | (2016.01) |
| B60L 15/20 | (2006.01) |
| B60W 20/14 | (2016.01) |
| B60L 50/61 | (2019.01) |
| B60L 58/12 | (2019.01) |
| B60W 40/076 | (2012.01) |
| B60W 40/072 | (2012.01) |

(52) U.S. Cl.
CPC ......... B60W 20/12 (2016.01); B60L 15/2045 (2013.01); B60L 50/61 (2019.02); B60L 58/12 (2019.02); B60W 20/14 (2016.01); *B60W 40/072* (2013.01); *B60W 40/076* (2013.01)

(58) Field of Classification Search
CPC .... B60W 20/12; B60W 20/14; B60W 40/072; B60W 40/076; B60L 58/12; B60L 50/61; B60L 15/2045
See application file for complete search history.

(56) References Cited

U.S. PATENT DOCUMENTS

| | | | |
|---|---|---|---|
| 6,059,064 A | * | 5/2000 | Nagano et al. ......... B60L 50/61 180/243 |
| 6,230,496 B1 | | 5/2001 | Hofmann et al. |
| 6,591,758 B2 | | 7/2003 | Kumar |
| 6,612,245 B2 | | 9/2003 | Kumar et al. |
| 6,612,246 B2 | | 9/2003 | Kumar |

(Continued)

OTHER PUBLICATIONS

Akil et al., "Energy Management and Sizing of a Hybrid Locomotive", 2007 European Conference on Power Electronics and Applications, pp. 1-10, Sep. 2-5, 2007.

(Continued)

*Primary Examiner* — Dale W Hilgendorf
(74) *Attorney, Agent, or Firm* — Christopher R. Carroll; The Small Patent Law Group LLC (57) ABSTRACT

A vehicle control system examines characteristics of an upcoming segment of a trip of a hybrid vehicle. One or more locations in the upcoming segment of the trip are identified based on the characteristics as places where an engine of the vehicle is incapable of generating enough energy to power the vehicle through the locations. Operational settings of the vehicle are calculated based on the locations to operate the vehicle in a way that charges an energy storage device with energy that can be used to replace or supplement the energy provided by the engine to propel the hybrid vehicle over or through the locations. The one or more processors are configured to one or more of automatically control or generate a control signal for automated operation of the hybrid vehicle according to the one or more operational settings that are calculated.

20 Claims, 3 Drawing Sheets

(56) References Cited

U.S. PATENT DOCUMENTS

| | | |
|---|---|---|
| 7,715,958 B2 | 5/2010 | Kumar |
| 8,014,914 B2 | 9/2011 | Boss et al. |
| 8,299,756 B2 | 10/2012 | Chawla et al. |
| 8,408,144 B2 | 4/2013 | Read |
| 8,587,260 B2 | 11/2013 | Kumar |
| 9,193,268 B2 | 11/2015 | Kumar |
| 9,200,554 B2 | 12/2015 | Cook |
| 9,545,854 B2 | 1/2017 | Daum et al. |
| 9,631,940 B2* | 4/2017 | Eikelenberg et al. .... B60L 1/00 |
| 9,682,624 B1 | 6/2017 | Koebler et al. |
| 9,751,521 B2 | 9/2017 | Schwartz et al. |
| 2002/0107618 A1* | 8/2002 | Deguchi et al. .... B60L 15/2045 701/22 |
| 2005/0228553 A1 | 10/2005 | Tryon |
| 2008/0300762 A1* | 12/2008 | Crombez .............. B60W 20/12 701/70 |
| 2009/0125170 A1 | 5/2009 | Noffsinger et al. |
| 2010/0094496 A1* | 4/2010 | Hershkovitz et al. .... B60L 3/12 701/22 |
| 2010/0174484 A1 | 7/2010 | Sivasubramaniam et al. |
| 2011/0246010 A1* | 10/2011 | De La Torre-Bueno ................... B60L 15/2045 701/22 |
| 2011/0313647 A1* | 12/2011 | Koebler et al. ..... B60L 15/2045 701/123 |
| 2012/0316717 A1* | 12/2012 | Daum et al. ............ B60L 58/12 701/22 |
| 2014/0121866 A1 | 5/2014 | Dangler |
| 2014/0316618 A1* | 10/2014 | Matthews, Jr. et al. .................... B60L 15/2045 701/19 |
| 2015/0298684 A1* | 10/2015 | Schwartz et al. ..... B60W 20/12 701/22 |
| 2015/0367736 A1 | 12/2015 | Salomonsen |

OTHER PUBLICATIONS

Wilson et al., "Power Management Control Optimization of a Hybrid Electric-Diesel Locomotive", 2016 Joint Rail Conference, pp. 7, Apr. 12-15, 2016.

* cited by examiner

HYBRID VEHICLE CONTROL SYSTEM

FIELD

The subject matter described herein relates to hybrid vehicles, such as vehicles that are propelled by two or more distinct sources of motive power.

BACKGROUND

Some hybrid vehicles can be propelled by power provided by different sources, such as a fuel-consuming engine and batteries. The engine consumes fuel to drive the wheels of a vehicle, or to drive an alternator or generator (which generates electric current that powers motors to propel the vehicle). The batteries can store electric energy that powers the same or different motors to also propel the vehicle.

One problem with some hybrid vehicles that are at least partially propelled by power from batteries is that the number and/or size of the batteries may add significant weight to the vehicles. This can result in reduced efficiency in operation of the engine and/or batteries to propel the vehicles. For example, as more batteries are added to a vehicle to reduce the amount of fuel that is consumed by the engine, the weight of the vehicle increases, thereby requiring more batteries and/or more fuel consumption by the engine to propel the vehicle. The increased number of batteries also can significantly add to the total cost of the vehicle.

BRIEF DESCRIPTION

In one embodiment, a vehicle control system is provided that includes one or more processors configured to access one or more memory structures storing one or more characteristics of one or more routes. The one or more processors also are configured to access the one or more memory structures to examine the one or more characteristics of at least an upcoming segment of a trip of a hybrid vehicle. The hybrid vehicle includes both a fuel-consuming engine and an energy storage device configured to generate energy to power the hybrid vehicle for propelling the hybrid vehicle along one or more routes of the trip. The one or more processors also are configured to identify one or more locations in the upcoming segment of the trip based on the one or more characteristics of the upcoming segment of the trip. The one or more locations are identified by the one or more processors as places where the engine alone of the hybrid vehicle is incapable of generating enough of the energy to power the hybrid vehicle for propelling the hybrid vehicle over or through the one or more locations. The one or more processors are configured to calculate one or more operational settings of the hybrid vehicle based on the one or more locations that are identified. The one or more operational settings are calculated by the one or more processors to operate the hybrid vehicle in such a way that the energy storage device is charged with a sufficient amount of the energy that can be used to replace or supplement the energy provided by the engine to propel the hybrid vehicle over or through the one or more locations. The one or more operational settings also are calculated by the one or more processors to reduce an amount of fuel consumed by the engine during the upcoming segment of the trip relative to the hybrid vehicle operating according to operational settings that differ from the one or more operational settings that are calculated. The one or more processors are configured to one or more of automatically control or generate a control signal for automated operation of the hybrid vehicle according to the one or more operational settings that are calculated.

In one embodiment, a method includes examining one or more characteristics of at least an upcoming segment of a trip of a hybrid vehicle. The hybrid vehicle includes both a fuel-consuming engine and an energy storage device configured to generate energy to power the hybrid vehicle for propelling the hybrid vehicle along one or more routes of the trip. The method also includes identifying one or more locations in the upcoming segment of the trip based on the one or more characteristics of the upcoming segment of the trip. The one or more locations are identified as places where the engine alone of the hybrid vehicle is incapable of generating enough of the energy to power the hybrid vehicle for propelling the hybrid vehicle over or through the one or more locations. The method also includes calculating one or more operational settings of the hybrid vehicle based on the one or more locations that are identified. The one or more operational settings are calculated to operate the hybrid vehicle in such a way that the energy storage device is charged with a sufficient amount of the energy that can be used to replace or supplement the energy provided by the engine to propel the hybrid vehicle over or through the one or more locations. The one or more operational settings also are calculated to reduce an amount of fuel consumed by the engine during the upcoming segment of the trip relative to the hybrid vehicle operating according to operational settings that differ from the one or more operational settings that are calculated. The method further includes automatically controlling operation of the hybrid vehicle according to the one or more operational settings that are calculated.

In one embodiment, a tangible and non-transitory computer-readable storage medium includes instructions that direct one or more processors to examine one or more characteristics of at least an upcoming segment of a trip of a hybrid vehicle. The hybrid vehicle includes both a fuel-consuming engine and an energy storage device configured to generate energy to power the hybrid vehicle for propelling the hybrid vehicle along one or more routes of the trip. The instructions also direct the one or more processors to identify one or more locations in the upcoming segment of the trip based on the one or more characteristics of the upcoming segment of the trip. The one or more locations are identified as places where the engine alone of the hybrid vehicle is incapable of generating enough of the energy to power the hybrid vehicle for propelling the hybrid vehicle over or through the one or more locations. The instructions also direct the one or more processors to calculate one or more operational settings of the hybrid vehicle based on the one or more locations that are identified. The one or more operational settings are calculated to operate the hybrid vehicle in such a way that the energy storage device is charged with a sufficient amount of the energy that can be used to replace or supplement the energy provided by the engine to propel the hybrid vehicle over or through the one or more locations. The one or more operational settings also are calculated to reduce an amount of fuel consumed by the engine during the upcoming segment of the trip relative to the hybrid vehicle operating according to operational settings that differ from the one or more operational settings that are calculated. The instructions also direct the one or more processors to automatically control operation of the hybrid vehicle according to the one or more operational settings that are calculated.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide hybrid vehicle systems and/or control systems for the hybrid vehicle systems. Through the use of the disclosed illustrative embodiments, it is possible to improve the efficiency in which a hybrid vehicle system operates while also reducing the size (and weight) of the engine and/or energy storage devices onboard the vehicle system. For example, the inventive subject matter described herein provides for a computerized system that works in conjunction with vehicular components and systems in order to improve the operation of a vehicle system that includes (and is propelled by) the vehicular components. Without the operation of the computerized systems described herein, the vehicle system may be required to have a larger (and heavier) engine, batteries, and the like, in order to complete some trips over routes within designated (e.g., previously scheduled) times. With operation of the computerized systems described herein, the vehicle system may be able to complete the same trips over the same routes within the same designated times, but with a smaller (and lighter) engine, batteries, and the like.

Figure 1:
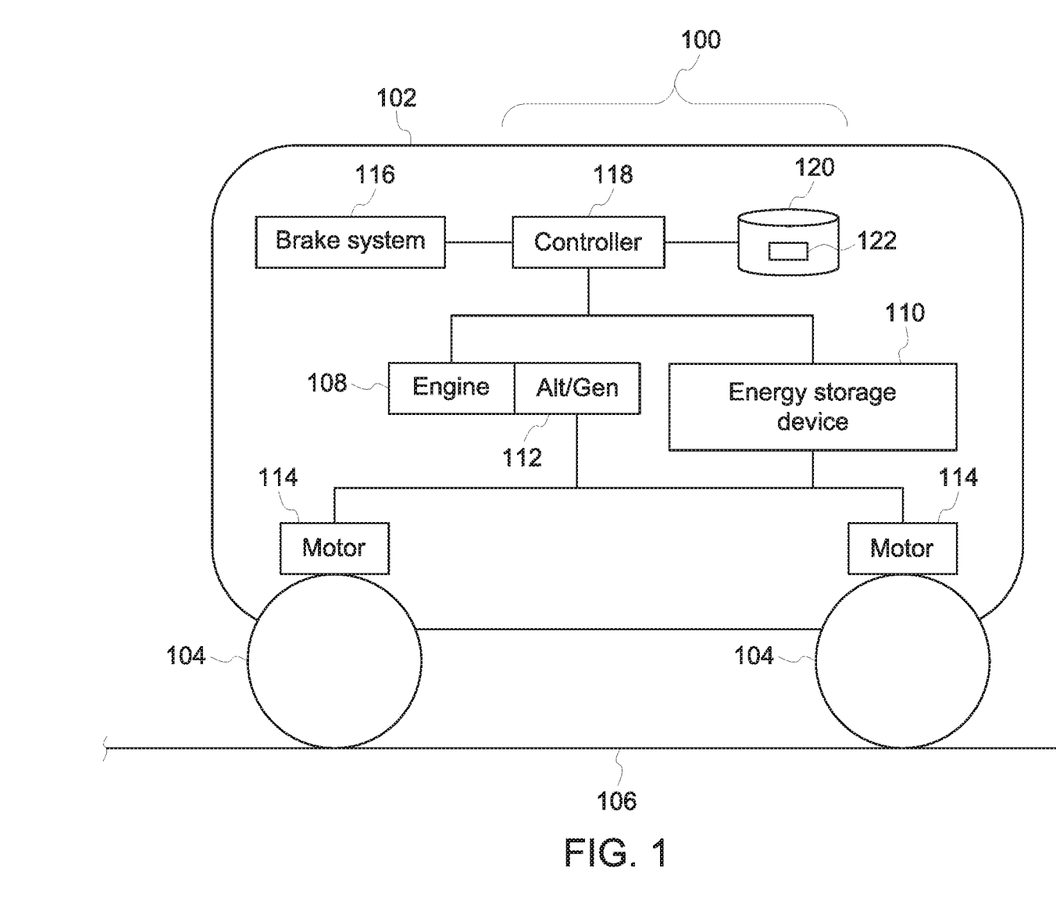
FIG. 1 illustrates one embodiment of a control system for a vehicle system.

FIG. 1 illustrates one embodiment of a control system 100 for a vehicle system 102. The vehicle system 102 (also referred to as a vehicle) is shown as a single vehicle having multiple wheels 104, but optionally can be formed from two or more vehicles that travel together along one or more routes 106. For example, two or more vehicles can be mechanically connected (e.g., by couplers) so that movement of one vehicle pulls and/or pushes at least one other vehicle so that the vehicle system formed from the multiple vehicles moves along the routes 106. As another example, two or more separate vehicles can be logically connected (e.g., by wireless communication between the control systems 100 onboard the separate vehicles) but not mechanically coupled with each other. These logically coupled vehicles can communicate with each other to coordinate the propulsion and/or braking performed by the separate vehicles so that the separate vehicles travel together along the routes 106 as a singular vehicle system, without the vehicles pulling or pushing each other (e.g., the vehicles travel together as a convoy).

The vehicle system 102 can be formed from any of a variety of different types of vehicles. For example, the vehicle system 102 can be formed from one or more automobiles, buses, trucks, or other road-based vehicles. As another example, the vehicle system 102 can be formed from one or more rail vehicles, such as locomotives. In another example, the vehicle system 102 can be formed from one or more other off-highway vehicles, such as mining vehicles, ore carts, or other vehicles that are not legally permitted and/or are not designed for travel on public roadways. As another example, the vehicle system 102 can be formed from one or more aircraft. In another example, the vehicle system 102 can be formed from one or more marine vessels. The routes 106 traveled by the vehicle system 102 depend on the type of vehicle(s) forming the vehicle system 102. For example, the routes 106 can be roads, ground-based paths, rails, airborne paths, waterways, and the like.

The vehicle system 102 is a hybrid vehicle system in that the vehicle system 102 includes two or more different sources or types of motive power. In the illustrated embodiment, the vehicle system 102 includes a fuel-consuming engine 108 and one or more energy storage devices 110. The engine 108 consumes a fuel, such as diesel fuel, gasoline, natural gas, hydrogen, methane, biodiesel, liquified petroleum gas, or the like. The engine 108 consumes the fuel from one or more onboard tanks or containers (not shown) in order to power an electric current-generating device 112 ("Alt/Gen" in FIG. 1), such as one or more alternators, generators, or combination of alternators and generators. For example, the engine 108 can operate to rotate a shaft that is coupled with a rotor in the device 112, which creates electric current from rotation of the shaft. This electric current is delivered to one or more motors 114 via one or more conductive pathways (e.g., cables, buses, etc.). The motors 114 are coupled with the wheels 104 by gears, transmissions, or the like, and rotate the wheels 104 to propel the vehicle system 102.

The energy storage devices 110 represent one or more batteries, flywheels, capacitors, or the like, that store sufficient electric energy to power the motors 114 to propel the vehicle system 102. The energy storage devices 110 can be charged prior to departing on a trip from a stationary power source (e.g., a utility grid), can be charged during movement from an overhead catenary or powered rail along the route 106, and/or can be charged from movement of the vehicle system 102 (e.g., regenerative braking using the motors 114). The energy storage devices 110 can supply current from the stored electric energy via one or more conductive pathways to the motors 114 to power the motors 114.

The vehicle system 102 also can include a brake system 116, which can represent one or more friction brakes, air brakes, or the like, that control slowing or stopping movement of the vehicle system 102. The brake system 116 can be separate from the motors 114 operating in a regenerative braking mode to slow or stop movement of the vehicle system 102, or alternatively the brake system 116 can include the motors 114.

The control system 100 is a computerized system that controls operations of some or all components of the vehicle system 102 to dictate which of the engine 108 or storage devices 110 are powering the motors 114, when the engine 108 or storage devices 110 are powering the motors 114, and/or when the storage devices 110 are charged with additional energy. This allows for the control system 100 to control operation of the energy storage device(s) 110 and the engine 108 to allow for reduced engine and/or battery size, while still maintaining power output from the vehicle system 102 and reducing fuel consumption by the engine 108 (relative to controlling operation of the energy storage device(s) 110 and/or engine 108 in another manner). The control system 100 can obtain knowledge of an upcoming trip of the vehicle system 102 and then operate the engine 108 and energy storage device(s) 110 for a reduced or lowest cumulative fuel consumption, while maintaining required power output at all times (e.g., total of engine power and battery power output) to ensure that the vehicle system 102 can traverse the routes 106 for the trip. This allows for a hybrid engine system in which the engine 108 cannot meet the power requirements for all points of the trip, but allows for a smaller engine and battery, thereby reducing system cost. The hybrid vehicle system 102 is then able to meet all power requirements for propelling the vehicle system 102 at all points or locations of a trip, even though the engine 108 alone cannot meet all power requirements of the trip.

For example, the engine 108 may be too small (e.g., the maximum amount of horsepower that the engine 108 can generate or is rated to generate by the manufacturer of the engine 108) to propel the vehicle system 102 over the routes 106 through the entire trip of the vehicle system 102. The control system 100 can coordinate operation of the engine 108 and energy storage device(s) 110 to ensure that the total power available from the engine 108 and the energy storage device(s) 110 is enough to propel the vehicle system 102 over the routes 106 through the entire trip of the vehicle system 102.

The control system 100 may need to obtain, calculate, or otherwise determine the power requirements of the upcoming trip for the vehicle system 102. The invention is a strategy developed to determine the operation of the engine and the battery before starting the trip to optimize fuel consumption while meeting power requirements. This includes charging the battery with the engine when the battery state of charge is below a predetermined limit and controlling the amount of power from the engine and battery when the power requirements is below a specified value to ensure that there will always be sufficient battery charge. This allows for the optimum energy usage by using the combination of braking energy and engine to charge the battery for the next occurrence of power that is greater than the engine power.

The control system 100 includes a controller 118 that represents hardware circuitry that includes and/or is connected with one or more processors (e.g., one or more microprocessors, one or more field programmable gate arrays, and/or one or more integrated circuits) that perform the operations described in connection with the control system 100. The controller 118 optionally can automatically control movement and/or braking of the vehicle system 102, such as by generating and/or communicating control signals to the motors 114 and/or brake system 116.

The control system 100 also includes one or more memory structures 120. The memory structure(s) 120 can represent one or more tangible and non-transitory computer-readable media, such as computer hard drives, flash drives, optical discs, removable drives, or the like. The memory structure(s) 120 store information that is used by the controller 118 to determine which of the engine 108 or energy storage device(s) 110 should power the wheels 104 or motors 114 and when to ensure that the vehicle system 102 has sufficient power to travel over the routes 106 for the entire duration of the trip.

The memory structure(s) 120 can store one or more characteristics of the routes 106, such as curvatures, grades, speed limits, or the like, as well as locations of where the curvatures, grades, speed limits, etc., are in the routes 106. For example, the memory structure(s) 120 can store or be a route database of this information. Optionally, the memory structure(s) 120 can store one or more other types of information that may be useful in determining an energy- and/or fuel-efficient way of controlling the engine 108 and energy storage device(s) 110, such as weather conditions, wind conditions, coefficients of friction of the routes 106, etc.

The controller 118 accesses the memory structure(s) 120 to examine characteristics of an upcoming segment of a trip of the vehicle system 102. For example, the controller 118 can obtain characteristics of the routes 106 that the vehicle system 102 will travel along for a trip from a starting location to a destination location prior to starting the trip. As another example, the controller 118 can obtain characteristics of the routes 106 that the vehicle system 102 will travel along for the trip while the vehicle system 102 is traveling (e.g., after departing from the starting location). The characteristics can be obtained for the upcoming segment that constitutes part or all of a remainder of the trip.

The controller 118 examines the characteristics to identify one or more locations in the upcoming segment of the trip where the engine 108 alone is incapable of generating enough energy to power the vehicle system 102 for propelling the vehicle system 102 over or through the one or more locations. The controller 118 uses the characteristics to calculate operational settings of the vehicle system 102 based on the locations that are identified.

These operational settings can include which of the devices 110 and/or 112 supply current to the motors 114, throttle settings, brake settings, motor torques, speeds, accelerations, decelerations, etc., according to which the vehicle system 102 is to move or otherwise operate. For example, the controller 118 can create a trip plan that designates or dictates different locations, distances along the routes 106, times, or the like, and indications of which of the devices 110 and/or 112 supplies current to power the motors 114 or wheels 104 at the corresponding locations. Optionally, the trip plan can designate or dictate locations, distances, and/or times where the device(s) 110 are to be charged (e.g., from regenerative braking of the motors 114).

The operational settings that are calculated by the controller 118 can be used to autonomously operate (and/or to direct the manual operation of) the vehicle system 102 in such a way that the total propulsive force or power provided by the devices 110 and/or 112 at each location, distance, and/or time during the trip is equal to or no less than the force or power required to propel the vehicle system 102 at or during that location, distance, or time. The operational settings can be determined by the controller 118 calculating how much force or power is needed to propel the vehicle system 102 at different locations, distances, and/or times. This calculation can be based on the weight of the vehicle system 102 (with increased weight requiring more force or power than lighter vehicle systems 102), the grade of the route 106 (with inclines requiring more force or power than declines), the curvature of the route 106 (with tighter curves requiring more force or power than curves with larger radii of curvature or straight portions of the route 106), etc. The calculations can be based on or measured from previous trips of the same or different vehicle system 102 over the same or different routes 106.

The controller 118 can determine the operational settings of the trip plan so that the energy storage device(s) 110 are charged with a sufficient amount of the energy that can be used to replace or supplement the energy provided by the engine 108 to propel the vehicle system 102 over or through one or more segments of the route 106. The operational settings also can be calculated by the controller 118 to reduce an amount of fuel consumed by the engine 108 relative to the vehicle system 102 operating according to other, different operational settings. For example, the controller 118 can create the operational settings such that the engine 108 operates to propel the vehicle system 102 in locations where the energy storage devices 110 do not have enough stored energy to propel the vehicle system 102, the energy storage devices 110 operates to propel the vehicle system 102 in locations where the energy storage devices 110 have enough stored energy to propel the vehicle system 102, and/or both the engine 108 and the energy storage devices 110 power the motors 114 to propel the vehicle system 102 in locations where the energy storage devices 110 alone cannot power the motors 114 to propel the vehicle system 102 through the locations and/or the engine 108 would inefficiently consume the fuel to propel the vehicle system 102 through the locations.

The controller 118 optionally can create control signals that dictate or designate operational settings of the vehicle system 102 to implement the operational settings calculated or otherwise determined by the controller 118. For example, the controller 118 can communicate a control signal to the engine 108, current generating device 112, energy storage device(s) 110, brake system 116, motors 114, or the like, that automatically control the movement of the vehicle system 102 according to the operational settings determined by the controller 118. Alternatively, the controller 118 can communicate the control signals to an output device (e.g., a display, speaker, or the like) to direct an operator of the vehicle system 102 how to control the vehicle system 102 to implement the operational settings determined by the controller 118.

Figure 2:
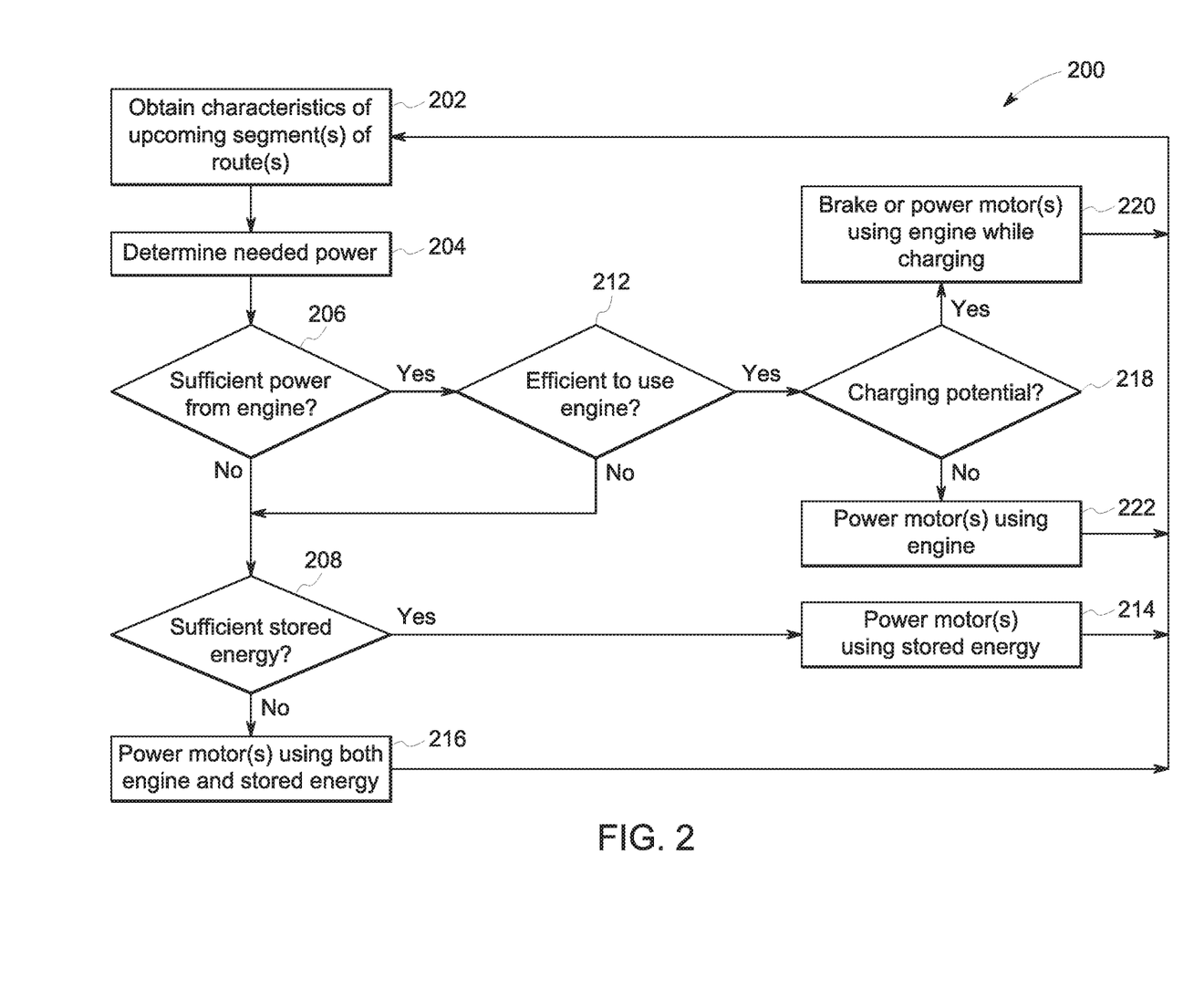
FIG. 2 illustrates a flowchart of one embodiment of a method for controlling a hybrid vehicle system.

FIG. 2 illustrates a flowchart of one embodiment of a method 200 for controlling a hybrid vehicle system. The method 200 represents operations performed by the controller 118 of the control system 100 in one embodiment. The operations in the flowchart can be directed by one or more sets of instructions 122 stored on a tangible and non-transitory computer readable storage medium, such as the memory structure(s) 120. These instructions can direct the operations of the controller 118.

At 202, one or more characteristics of one or more upcoming segments of route(s) being traveled on or about to be traveled on by a vehicle system are obtained. The controller 118 can obtain these characteristics from the memory structure 120 and/or from one or more sensors (e.g., cameras, accelerometers, inclinometers, etc.). The characteristics can include grades of the route 106, curvatures of the route 106, or other information that may impact how much electric energy is needed to power the motors 114 to propel the vehicle system 102 over or through the upcoming segment(s) of the route 106.

Figure 3:
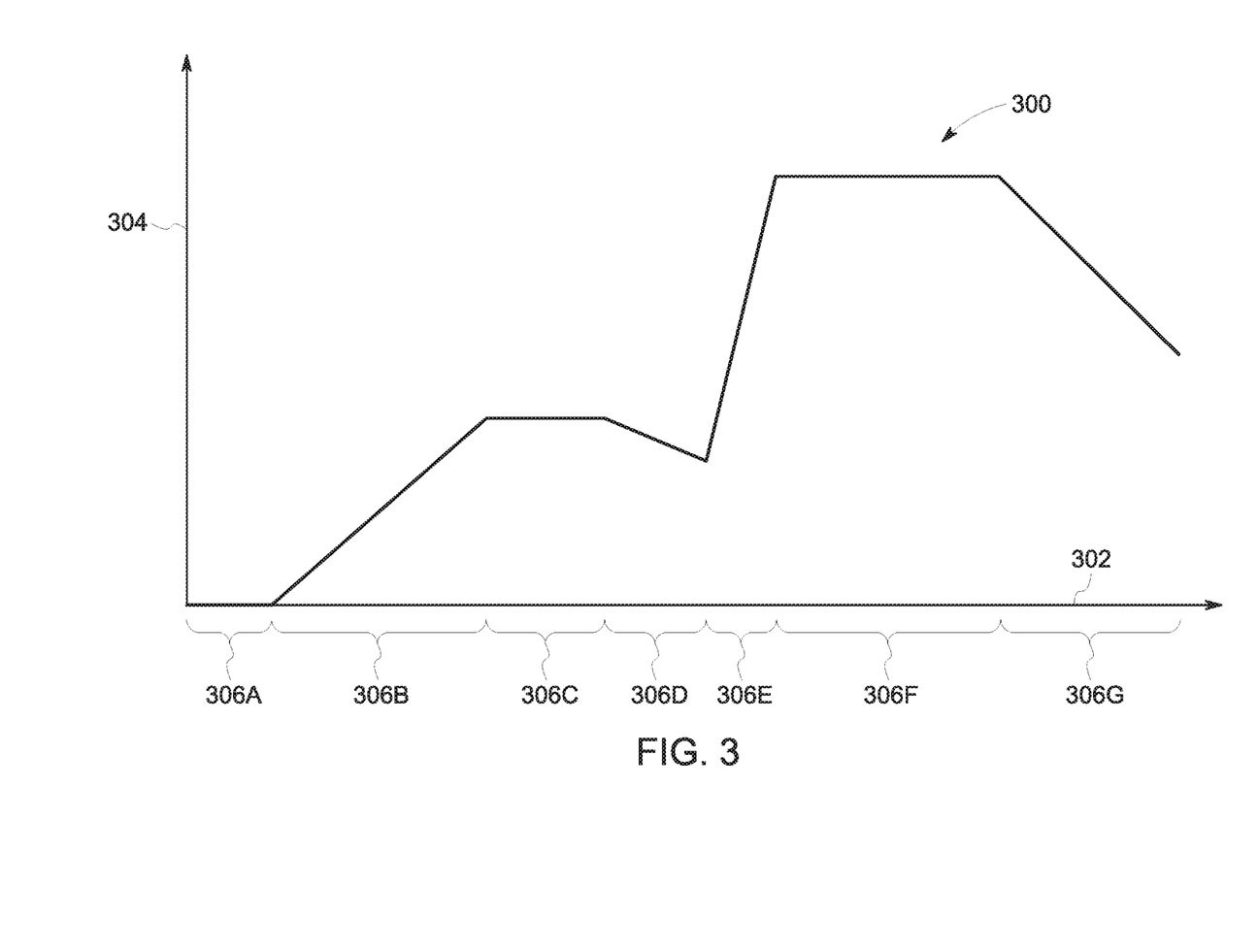
FIG. 3 illustrates one example of characteristics of routes being traveled upon or to be traveled upon by the vehicle system shown in FIG. 1 during a current or upcoming trip.

With continued reference to the flowchart of the method 200 shown in FIG. 2, FIG. 3 illustrates one example of characteristics 300 of the routes 106 being traveled upon or to be traveled upon by the vehicle system 102 during a current or upcoming trip. The characteristics 300 are shown alongside a horizontal axis 302 representative of locations along the routes 106, distance along the routes 106, and/or elapsed or scheduled upcoming time during the trip. The characteristics 300 also are shown alongside a vertical axis 304 representative of magnitudes of the characteristics 300. For example, larger values of the characteristics 300 along the vertical axis 304 can represent steeper inclines, smaller radii of curvature, or the like. The characteristics 300 shown in FIG. 3 represent a profile of the routes 106 for the trip. This profile can be obtained for part, but not all, of the upcoming trip (e.g., a segment of the routes 106) or can be obtained for all of the upcoming trip.

At 204 in the flowchart of the method 200 shown in FIG. 2, an amount of needed power to traverse an upcoming segment of the route in the trip is determined. The controller 118 can calculate the power needed to power the motors 114 to propel the vehicle system 102 over or along the upcoming segment of the route 106 based on at least the characteristics of the routes 106. This power requirement can be the power needed to propel the vehicle system 102 to travel at a designated speed, such as a speed limit of the routes 106. The power requirement also can be based on other characteristics, such as the total load of the vehicle system 102 (e.g., the weight of the vehicle system 102 and optionally the cargo carried by the vehicle system 102).

The controller 118 can examine the characteristics 300 for one or more different segments 306 (e.g., segments 306A-G) of the route 106. For example, the characteristics 300 can represent elevations of the route 106, which can be used to determine or infer the grades of the route 106. For example, due to the changes in the elevations in the route 106, the segments 306A, 306C, 306F indicate flat portions of the route 106, the segments 306B, 306E indicate uphill portions of the route 106, and the segments 306D, 306G indicate downhill portions of the route 106.

The controller 118 can determine that the characteristics 300 in the downhill segments 306D, 306G may require less power to move the vehicle system 102 through those segments 306D, 306G relative to other segments 306A-C, 306E-F. The controller 118 can determine that the characteristics 300 in the flat segments 306A, 306F may require more power to move the vehicle system 102 through the segments 306A, 306F relative to other segments 306D, 306G. The controller 118 can determine that the characteristics 300 in the uphill segments 306B, 306E may require more power to move the vehicle system 102 through the segments 306B, 306E relative to other segments 306A, 306C-D, 306F-G. The controller 118 can perform these determinations by estimating or calculating the amount of propulsive force needed to move the vehicle system 102 based on the weight of the vehicle system 102, the characteristics 300, and/or other information (e.g., wind speed and direction).

In one embodiment, the controller 118 also examines the magnitude of the characteristics 300 to determine the amount of power needed. For example, because the elevation of the route 106 increases by a greater amount in the segment 306E than in the other segments 306A-D, 306F-G, the controller 118 can determine that the segment 306E may require more power to travel over than the segments 306A-D, 306F-G. The controller 118 can examine the length or distance along the route 106 that the characteristics 300 are the same or similar to determine the power needed to travel over the segments 306. For example, the characteristics 300 can be similar when the characteristics 300 indicate that consecutive, neighboring, or adjacent locations or areas along the route 106 have an incline, when the characteristics 300 indicate that consecutive, neighboring, or adjacent locations or areas along the route 106 have a decline, or when the characteristics 300 indicate that consecutive, neighboring, or adjacent locations or areas along the route 106 are flat. Segments 306 having longer stretches of the route 106 with the same or similar incline may indicate that more power is needed to traverse those segments 306, while segments 306 having shorter stretches of the route 106 with incline may indicate that less power is needed. For example, the segment 306B may require more power to travel over than the segment 306E because the segment 306B indicates an incline over a longer portion of the route 106 than the segment 306E, even though the segment 306B indicates a steeper increase in grade or elevation.

Optionally, the controller 118 can estimate the power needed based on previous travels by the same or other vehicle system 102 over the same route segments 306. For example, the torque generated by the motors 114 to propel the vehicle system 102 over the segments 306 during a previous trip can be measured and used to estimate the power needed to propel the vehicle system 102 over the same segments 306 during a subsequent trip.

At 206 in the flowchart of the method 200 shown in FIG. 2, a determination is made as to whether the engine of the vehicle system can generate at least the amount of power needed to travel over the upcoming segment of the route. The controller 118 can refer to a maximum or other upper limit on the power rating of the engine 108 to determine whether the engine 108 can generate sufficient horsepower to result in the generating device 112 creating enough electric current to power the motors 114 to propel the vehicle system 102 through an upcoming segment 306.

The engine 108 in the vehicle system 102 may be smaller due to the availability of the energy storage devices 110 to power the motors 114 than if the vehicle system 102 did not include the energy storage devices 110. As a result, the engine 108 may not be able to provide enough power to also power the motors 114 to propel the vehicle system 102 through all segments 306 of the route 106.

If the maximum or rated power output of the engine 108 is too low to power the motors 114 to propel the vehicle system 102 over or through the upcoming route segment 306, then the controller 118 may determine that another or additional source of motive power is needed. As a result, flow of the method 200 can flow toward 208.

But, if the maximum or rated power output of the engine 108 is at least as great as the power needed to power the motors 114 to propel the vehicle system 102 over or through the upcoming route segment 306, then the controller 118 may determine that the engine 108 can be used to propel the vehicle system 102. As a result, flow of the method 200 can flow toward 212.

At 208, a determination is made as to whether there is sufficient stored energy in the energy storage devices to power the motors to propel the vehicle system through the upcoming segment of the route. The controller 118 can examine the watt-hours of electric energy stored in the energy storage devices 110 to determine if there is enough stored energy for the energy storage devices 110 alone to power the motors 114. For example, the controller 118 can refer to a look-up table or other source (e.g., in the memory structure 120) to determine how much stored electric energy is needed to meet or exceed the requirement to power the motors 114 to propel the vehicle system 102 through or over the upcoming segment of the route 106. The amount of energy stored in the energy storage devices 110 can be ascertained by the controller 118 based on output provided by one or more sensors, such as an ammeter.

If the energy storage devices 110 do not have enough stored energy to power the motors 114 to propel the vehicle system 102 over or through the upcoming route segment 306, then the controller 118 may determine that the energy storage devices 110 cannot power the vehicle system 102 through or over the upcoming segment 306 without an additional power source. As a result, flow of the method 200 can flow toward 216.

But, if the energy storage devices 110 do have enough stored energy to power the motors 114 to propel the vehicle system 102 over or through the upcoming route segment 306, then the controller 118 may determine that the energy storage devices 110 can be used to propel the vehicle system 102 without any other power source. As a result, flow of the method 200 can flow toward 214.

At 214, the motors of the vehicle system are powered by energy provided from the energy storage devices. For example, the controller 118 can generate and communicate a control signal to the energy storage devices 110, the motors 114, the engine 108, and/or the current-generating device 112 that directs the motors 114 to be powered from current provided from stored energy in the energy storage devices 110. The energy storage devices 110 alone can power the motors 114 to propel the vehicle system 102 through the upcoming segment 306, without the motors 114 receiving or otherwise being powered by current from the operation of the engine 108 and current-generating device 112. Flow of the method 200 can then return toward 202 or optionally can terminate.

At 216, the motors of the vehicle system are powered by electric current provided via both the engine and the energy storage devices. The controller 118 can send control signals to the engine 108, the current-generating device 112, and the energy storage devices 110 to operate and supply current to the motors 114 to power the motors 114 to propel the vehicle system 102 through or over the upcoming segment 306 in the route 106. Flow of the method 200 can then return toward 202 or optionally can terminate.

Returning to the decision made at 206, if the engine 108 can operate to generate enough current via the current-generating device 112 to power the motors 114 to propel the vehicle system 102 through or over the upcoming segment 306 in the route 106, then a determination is made at 212 as to whether propelling the vehicle system using only the engine is an efficient way to operate the vehicle system. For example, the controller 118 may determine if less fuel would be consumed by the vehicle system 102 being propelled entirely or at least partially from the motors 114 being powered by the energy storage devices 110. The controller 118 can examine the amount of energy stored in the energy storage devices 110 and upcoming segments 306 to determine if the energy storage devices 110 have enough stored energy to both power the motors 114 to provide additional tractive effort that augments the power supplied to the motors 114 via the engine 108 and to provide needed power to travel over one or more additional upcoming segments 306. If the vehicle system 102 can travel over the upcoming segment 306 in an efficient manner using the engine 108 and not the energy storage devices 110, then flow of the method 200 can proceed toward 218. Otherwise, flow of the method 200 can proceed toward 208, described above.

At 218, a determination is made as to whether one or more upcoming segments in the route provide a potential for re-charging the energy storage devices onboard the vehicle system. The controller 118 can look ahead to the characteristics 300 for one or more upcoming segments 306 of the route 106, even if the characteristics 300 are associated with a segment 306 that is not the next segment 306 that the vehicle system 102 will travel on and/or the segment 306 is not the segment 306 in which the vehicle system 102 is currently traveling. For example, even though the vehicle system 102 is currently traveling on the segment 306B and the controller 118 is examining the characteristics 300 associated with the segment 306D and/or 306E at 202, 204 and at the decisions made at 206, 208, and/or 212, the controller 118 also can examine the characteristics 300 associated with the segments 306F and/or 306G at 218 to determine whether a potential for charging the devices 110 exists.

The controller 118 can determine that an upcoming segment 306 provides a potential for charging the energy storage device(s) 110 when the power required to propel the vehicle system 102 over or through the upcoming segment 306 is less than the maximum or other upper limit on power that the engine 108 is capable of providing. For example, the engine 108 may be capable of providing enough power to cause the current-generating device 112 to generate enough current to fully and completely power the motors 114 to propel the vehicle system 102 over or through the segment 306 (e.g., while traveling at a speed limit of the segment 306 of the route 106 and/or staying on a previously determined schedule). Or, the engine 108 may be capable of providing enough power to cause the current-generating device 112 to generate enough current to fully and completely power the motors 114 to propel the vehicle system 102 over or through the segment 306 (e.g., while traveling at a speed limit of the segment 306 of the route 106 and/or staying on a previously determined schedule), without the engine 108 consuming more than a designated amount of fuel (e.g., without increasing the amount of fuel consumed by the engine 108 relative to a previous segment 306, such as a flat segment 306A, 306C, or 306F).

In one embodiment, the controller 118 identifies a potential for recharging the energy storage devices 110 responsive to an upcoming segment 306 of the route 106 (which could be, but is not necessarily, the next segment 306) when the characteristics 300 of the upcoming segment 306 indicate a decrease in the amount of power required to propel the vehicle system 102 relative to a current or previous segment 306 of the route 106. For example, the downhill segments 306D, 306G may require less power to propel the vehicle system 102 through the segments 306D, 306G due to the assistance of gravity in moving the vehicle system 102 down the route 106 in the segments 306D, 306G. The controller 118 can identify these segments 306D, 306G as being sections of the route 106 where the vehicle system 102 can be propelled by operation of the engine 108 or with gravity alone (e.g., the vehicle system 102 rolls down the route 106 without the engine 108 operating to propel the vehicle system 102), and without power being supplied by the energy storage devices 110 to the motors 114. If the controller 118 identifies such an upcoming segment 306 of the route 106 with charging potential, then flow of the method 200 can proceed from 218 toward 220. If the controller 118 is unable to identify such an upcoming segment 306 of the route 106 with charging potential, then flow of the method 200 can proceed from 218 toward 222.

At 220, the vehicle system is controlled to brake and/or power the motors using operation of the engine through the upcoming segment of the route, with the energy storage devices being charged during travel through the upcoming segment of the route. For example, the controller 118 can create and communicate a control signal to the brake system 116 that directs one or more of the motors 114 regeneratively brake so that the braking motors 114 create current. This current can be directed to the energy storage devices 110 to charge the energy storage devices 110. Optionally, the controller 118 can direct the engine 108 to continue operating to create current via the current-generating device 112 to power at least one of the motors 114 to propel the vehicle system 102, while at least one other motor 114 regeneratively brakes to charge the energy storage devices 110. Flow of the method 200 can then return toward 202, or optionally can terminate.

At 222, the vehicle system is controlled to propel the vehicle system using the motors being powered by operation of the engine and current-generating device. For example, the controller 118 can create and communicate a control signal to the engine 108, current-generating device 112, and/or the motors 114 that directs the engine 108 and device 112 to operate to create current that powers the motors 114. This current can be directed to the motors 114 to power the motors 114 to propel the vehicle system 102 through or over the upcoming segment 306 of the route 106. Flow of the method 200 can then return toward 202, or optionally can terminate.

In one embodiment, a vehicle control system is provided that includes one or more processors configured to access one or more memory structures storing one or more characteristics of one or more routes. The one or more processors also are configured to access the one or more memory structures to examine the one or more characteristics of at least an upcoming segment of a trip of a hybrid vehicle. The hybrid vehicle includes both a fuel-consuming engine and an energy storage device configured to generate energy to power the hybrid vehicle for propelling the hybrid vehicle along one or more routes of the trip. The one or more processors also are configured to identify one or more locations in the upcoming segment of the trip based on the one or more characteristics of the upcoming segment of the trip. The one or more locations are identified by the one or more processors as places where the engine alone of the hybrid vehicle is incapable of generating enough of the energy to power the hybrid vehicle for propelling the hybrid vehicle over or through the one or more locations as least as fast as a designated moving speed. The one or more processors are configured to calculate one or more operational settings of the hybrid vehicle based on the one or more locations that are identified. The one or more operational settings are calculated by the one or more processors to operate the hybrid vehicle in such a way that the energy storage device is charged with a sufficient amount of the energy that can be used to replace or supplement the energy provided by the engine to propel the hybrid vehicle over or through the one or more locations. The one or more operational settings also are calculated by the one or more processors to reduce an amount of fuel consumed by the engine during the upcoming segment of the trip relative to the hybrid vehicle operating according to operational settings that differ from the one or more operational settings that are calculated. The one or more processors are configured to one or more of automatically control or generate a control signal for automated operation of the hybrid vehicle according to the one or more operational settings that are calculated.

Optionally, the one or more processors are configured to calculate the one or more operational settings such that the hybrid vehicle is able to be propelled through the upcoming segment of the trip with the engine having a reduced power capability relative to another engine that would be required to propel the hybrid vehicle operating according to other, different operational settings.

Optionally, the one or more processors are configured to calculate the one or more operational settings such that the hybrid vehicle is able to be propelled through the upcoming segment of the trip with the energy storage device having a reduced energy storage capability relative to another energy storage device that would be required to propel the hybrid vehicle operating according to other, different operational settings.

Optionally, the one or more processors are configured to calculate one or more of a throttle setting of the hybrid vehicle, a brake setting of the hybrid vehicle, a speed of the hybrid vehicle, or an acceleration of the hybrid vehicle as the one or more operational settings.

Optionally, the one or more processors are configured to examine one or more of an incline of the one or more routes, a decline of the one or more routes, or a curvature of the one or more routes as the one or more characteristics of the upcoming trip or the upcoming segment of the trip.

Optionally, the one or more processors are configured to identify the one or more locations by locating an incline in the one or more routes where the engine alone is incapable of generating enough of the energy to propel the hybrid vehicle up the incline as least as fast as the designated moving speed. For example, the engine may not be capable of generating enough power to cause the vehicle system to move up the incline at any speed. As another example, the engine may be capable of generating power to move the vehicle system up the incline, but not enough power to cause the vehicle system to move at least as fast as the designated speed. The designated speed can be a speed limit of the route, or can be a fraction of the speed limit (e.g., 50% of the speed limit).

Optionally, the one or more processors are configured to calculate the one or more operational settings by selecting a previous segment of the trip ahead of the incline where the energy storage device is charged with one or more of energy from regenerative braking or energy created by operation of the engine.

Optionally, the one or more processors are configured to identify the one or more locations by locating a decline in the one or more routes where the engine alone is capable of generating enough of the energy to propel the hybrid vehicle down the decline.

Optionally, the one or more processors are configured to calculate the one or more operational settings to direct the hybrid vehicle to brake during travel down the decline and create regenerative energy that charges the energy storage device using regenerative braking.

In one embodiment, a method includes examining one or more characteristics of at least an upcoming segment of a trip of a hybrid vehicle. The hybrid vehicle includes both a fuel-consuming engine and an energy storage device configured to generate energy to power the hybrid vehicle for propelling the hybrid vehicle along one or more routes of the trip. The method also includes identifying one or more locations in the upcoming segment of the trip based on the one or more characteristics of the upcoming segment of the trip. The one or more locations are identified as places where the engine alone of the hybrid vehicle is incapable of generating enough of the energy to power the hybrid vehicle for propelling the hybrid vehicle over or through the one or more locations as least as fast as a designated moving speed. The method also includes calculating one or more operational settings of the hybrid vehicle based on the one or more locations that are identified. The one or more operational settings are calculated to operate the hybrid vehicle in such a way that the energy storage device is charged with a sufficient amount of the energy that can be used to replace or supplement the energy provided by the engine to propel the hybrid vehicle over or through the one or more locations. The one or more operational settings also are calculated to reduce an amount of fuel consumed by the engine during the upcoming segment of the trip relative to the hybrid vehicle operating according to operational settings that differ from the one or more operational settings that are calculated. The method further includes automatically controlling operation of the hybrid vehicle according to the one or more operational settings that are calculated.

Optionally, the one or more operational settings are calculated such that the hybrid vehicle is able to be propelled through the upcoming segment of the trip with the engine having a reduced power capability relative to another engine that would be required to propel the hybrid vehicle operating according to other, different operational settings.

Optionally, the one or more operational settings are calculated such that the hybrid vehicle is able to be propelled through the upcoming segment of the trip with the energy storage device having a reduced energy storage capability relative to another energy storage device that would be required to propel the hybrid vehicle operating according to other, different operational settings.

Optionally, the one or more operational settings that are calculated include one or more of a throttle setting of the hybrid vehicle, a brake setting of the hybrid vehicle, a speed of the hybrid vehicle, or an acceleration of the hybrid vehicle.

Optionally, the one or more characteristics of the upcoming trip or the upcoming segment of the trip include one or more of an incline of the one or more routes, a decline of the one or more routes, or a curvature of the one or more routes.

Optionally, identifying the one or more locations includes locating an incline in the one or more routes where the engine alone is incapable of generating enough of the energy to propel the hybrid vehicle up the incline as least as fast as the designated moving speed.

Optionally, calculating the one or more operational settings includes selecting a previous segment of the trip ahead of the incline where the energy storage device is charged with one or more of energy from regenerative braking or energy created by operation of the engine.

Optionally, identifying the one or more locations includes locating a decline in the one or more routes where the engine alone is capable of generating enough of the energy to propel the hybrid vehicle down the decline.

Optionally, calculating the one or more operational settings includes directing the hybrid vehicle to brake during travel down the decline and create regenerative energy that charges the energy storage device using regenerative braking.

In one embodiment, a tangible and non-transitory computer-readable storage medium includes instructions that direct one or more processors to examine one or more characteristics of at least an upcoming segment of a trip of a hybrid vehicle. The hybrid vehicle includes both a fuel-consuming engine and an energy storage device configured to generate energy to power the hybrid vehicle for propelling the hybrid vehicle along one or more routes of the trip. The instructions also direct the one or more processors to identify one or more locations in the upcoming segment of the trip based on the one or more characteristics of the upcoming segment of the trip. The one or more locations are identified as places where the engine alone of the hybrid vehicle is incapable of generating enough of the energy to power the hybrid vehicle for propelling the hybrid vehicle over or through the one or more locations as least as fast as a designated moving speed. The instructions also direct the one or more processors to calculate one or more operational settings of the hybrid vehicle based on the one or more locations that are identified. The one or more operational settings are calculated to operate the hybrid vehicle in such a way that the energy storage device is charged with a sufficient amount of the energy that can be used to replace or supplement the energy provided by the engine to propel the hybrid vehicle over or through the one or more locations. The one or more operational settings also are calculated to reduce an amount of fuel consumed by the engine during the upcoming segment of the trip relative to the hybrid vehicle operating according to operational settings that differ from the one or more operational settings that are calculated. The instructions also direct the one or more processors to automatically control operation of the hybrid vehicle according to the one or more operational settings that are calculated.

Optionally, the instructions direct the one or more processors to calculate the one or more operational settings such that the hybrid vehicle is able to be propelled through the upcoming segment of the trip with the engine having a reduced power capability relative to another engine that would be required to propel the hybrid vehicle operating according to other, different operational settings.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    one or more processors configured to examine one or more route characteristics of at least an upcoming segment of a trip of a hybrid vehicle, the hybrid vehicle including both a fuel-consuming engine and an energy storage device configured to generate energy to power the hybrid vehicle for propelling the hybrid vehicle along one or more routes of the trip,
    the one or more processors are configured to identify one or more locations in the upcoming segment of the trip based on the one or more route characteristics, the one or more locations identified by the one or more processors as places where the engine alone of the hybrid vehicle is incapable of generating enough of the energy to power the hybrid vehicle for propelling the hybrid vehicle over or through the one or more locations as least as fast as a designated moving speed,
    the one or more processors are configured to calculate one or more operational settings of the hybrid vehicle based on the one or more locations that are identified, the one or more operational settings calculated by the one or more processors to operate the hybrid vehicle in such a way that the energy storage device is charged with a sufficient amount of the energy that can be used to replace or supplement the energy provided by the engine to propel the hybrid vehicle over or through the one or more locations, the one or more operational settings also calculated by the one or more processors to reduce an amount of fuel consumed by the engine during the upcoming segment of the trip relative to the hybrid vehicle operating according to operational settings that differ from the one or more operational settings that are calculated,
    wherein the one or more processors are configured to one or more of automatically control or generate a control signal for automated operation of the hybrid vehicle according to the one or more operational settings that are calculated.

2. The system of claim 1, wherein the one or more processors are configured to calculate the one or more operational settings such that the hybrid vehicle is able to be propelled through the upcoming segment of the trip with the engine having a reduced power capability relative to another engine that would be required to propel the hybrid vehicle operating according to other, different operational settings.

3. The system of claim 1, wherein the one or more processors are configured to calculate the one or more operational settings such that the hybrid vehicle is able to be propelled through the upcoming segment of the trip with the energy storage device having a reduced energy storage capability relative to another energy storage device that would be required to propel the hybrid vehicle operating according to other, different operational settings.

4. The system of claim 1, wherein the one or more processors are configured to calculate one or more of a throttle setting of the hybrid vehicle, a brake setting of the hybrid vehicle, a speed of the hybrid vehicle, or an acceleration of the hybrid vehicle as the one or more operational settings.

5. The system of claim 1, wherein the one or more processors are configured to examine one or more of an incline of the one or more routes, a decline of the one or more routes, or a curvature of the one or more routes as the one or more route characteristics.

6. The system of claim 1, wherein the one or more processors are configured to identify the one or more locations by locating an incline in the one or more routes where the engine alone is incapable of generating enough of the energy to propel the hybrid vehicle up the incline as least as fast as the designated moving speed.

7. The system of claim 6, wherein the one or more processors are configured to calculate the one or more operational settings by selecting a previous segment of the trip ahead of the incline where the energy storage device is charged with one or more of energy from regenerative braking or energy created by operation of the engine.

8. The system of claim 1, wherein the one or more processors are configured to identify the one or more locations by locating a decline in the one or more routes where the engine alone is capable of generating enough of the energy to propel the hybrid vehicle down the decline.

9. The system of claim 8, wherein the one or more processors are configured to calculate the one or more operational settings to direct the hybrid vehicle to brake during travel down the decline and create regenerative energy that charges the energy storage device using regenerative braking.

10. A method comprising:
examining one or more route characteristics of at least an upcoming segment of a trip of a hybrid vehicle, the hybrid vehicle including both a fuel-consuming engine and an energy storage device configured to generate energy to power the hybrid vehicle for propelling the hybrid vehicle along one or more routes of the trip;
identifying one or more locations in the upcoming segment of the trip based on the one or more route characteristics, the one or more locations identified as places where the engine alone of the hybrid vehicle is incapable of generating enough of the energy to power the hybrid vehicle for propelling the hybrid vehicle over or through the one or more locations as least as fast as a designated moving speed;
calculating one or more operational settings of the hybrid vehicle based on the one or more locations that are identified, the one or more operational settings calculated to operate the hybrid vehicle in such a way that the energy storage device is charged with a sufficient amount of the energy that can be used to replace or supplement the energy provided by the engine to propel the hybrid vehicle over or through the one or more locations, the one or more operational settings also calculated to reduce an amount of fuel consumed by the engine during the upcoming segment of the trip relative to the hybrid vehicle operating according to operational settings that differ from the one or more operational settings that are calculated; and
automatically controlling operation of the hybrid vehicle according to the one or more operational settings that are calculated.

11. The method of claim 10, wherein the one or more operational settings are calculated such that the hybrid vehicle is able to be propelled through the upcoming segment of the trip with the engine having a reduced power capability relative to another engine that would be required to propel the hybrid vehicle operating according to other, different operational settings.

12. The method of claim 10, wherein the one or more operational settings are calculated such that the hybrid vehicle is able to be propelled through the upcoming segment of the trip with the energy storage device having a reduced energy storage capability relative to another energy storage device that would be required to propel the hybrid vehicle operating according to other, different operational settings.

13. The method of claim 10, wherein the one or more operational settings that are calculated include one or more of a throttle setting of the hybrid vehicle, a brake setting of the hybrid vehicle, a speed of the hybrid vehicle, or an acceleration of the hybrid vehicle.

14. The method of claim 10, wherein the one or more route characteristics include one or more of an incline of the one or more routes, a decline of the one or more routes, or a curvature of the one or more routes.

15. The method of claim 10, wherein identifying the one or more locations includes locating an incline in the one or more routes where the engine alone is incapable of generating enough of the energy to propel the hybrid vehicle up the incline as least as fast as the designated moving speed.

16. The method of claim 15, wherein calculating the one or more operational settings includes selecting a previous segment of the trip ahead of the incline where the energy storage device is charged with one or more of energy from regenerative braking or energy created by operation of the engine.

17. The method of claim 10, wherein identifying the one or more locations includes locating a decline in the one or more routes where the engine alone is capable of generating enough of the energy to propel the hybrid vehicle down the decline.

18. The method of claim 17, wherein calculating the one or more operational settings includes directing the hybrid vehicle to brake during travel down the decline and create regenerative energy that charges the energy storage device using regenerative braking.

19. A tangible and non-transitory computer-readable storage medium comprising instructions that direct one or more processors to:
examine one or more characteristics of at least an upcoming segment of a trip of a hybrid vehicle, the hybrid vehicle including both a fuel-consuming engine and an energy storage device configured to generate energy to power the hybrid vehicle for propelling the hybrid vehicle along one or more routes of the trip;
identify one or more locations in the upcoming segment of the trip based on the one or more characteristics of the upcoming segment of the trip, the one or more locations identified as places where the engine alone of the hybrid vehicle is incapable of generating enough of the energy to power the hybrid vehicle for propelling the hybrid vehicle over or through the one or more locations;
calculate one or more operational settings of the hybrid vehicle based on the one or more locations that are identified, the one or more operational settings calculated to operate the hybrid vehicle in such a way that the energy storage device is charged with a sufficient amount of the energy that can be used to replace or supplement the energy provided by the engine to propel the hybrid vehicle over or through the one or more locations, the one or more operational settings also calculated to reduce an amount of fuel consumed by the engine during the upcoming segment of the trip relative to the hybrid vehicle operating according to operational settings that differ from the one or more operational settings that are calculated; and
automatically control operation of the hybrid vehicle according to the one or more operational settings that are calculated.

20. The computer-readable storage medium of claim 19, wherein the instructions direct the one or more processors to calculate the one or more operational settings such that the hybrid vehicle is able to be propelled through the upcoming segment of the trip with the engine having a reduced power capability relative to another engine that would be required to propel the hybrid vehicle operating according to other, different operational settings.

\* \* \* \* \*